United States Patent [19]

Chubb

[11] 3,997,001
[45] Dec. 14, 1976

[54] HEAT ENERGY RESERVOIR USING SOLID REMOVAL AND GRAVITATION SETTLING IN A MOLTEN-SOLID SALT BATH

[76] Inventor: Talbot A. Chubb, 5023 N. 38th St., Arlington, Va. 22207

[22] Filed: Apr. 17, 1975

[21] Appl. No.: 568,971

[52] U.S. Cl. ............................. 165/94; 165/104 S; 126/400
[51] Int. Cl.² .................... F28D 19/00; F28G 1/08
[58] Field of Search .................. 165/104 S, 94, 107, 165/106; 126/400

[56] References Cited
UNITED STATES PATENTS

| | | | |
|---|---|---|---|
| 3,080,706 | 3/1963 | Flynn, Jr. et al. ........... | 165/104 S X |
| 3,475,596 | 10/1969 | Lawrence et al. .......... | 165/104 S X |
| 3,492,461 | 1/1970 | Lawrence ................... | 165/104 S X |

*Primary Examiner*—Albert W. Davis, Jr.
*Attorney, Agent, or Firm*—R. S. Sciascia; Philip Schneider; Melvin L. Crane

[57] ABSTRACT

A reservoir of salt eutectic which includes a plurality of heat pipes in the bottom through which a hot gas passes, and pipes near the top through which water passes and is converted to steam. Means is provided for scraping the salt from the pipes so that the pipes will give off sufficient heat.

4 Claims, 1 Drawing Figure

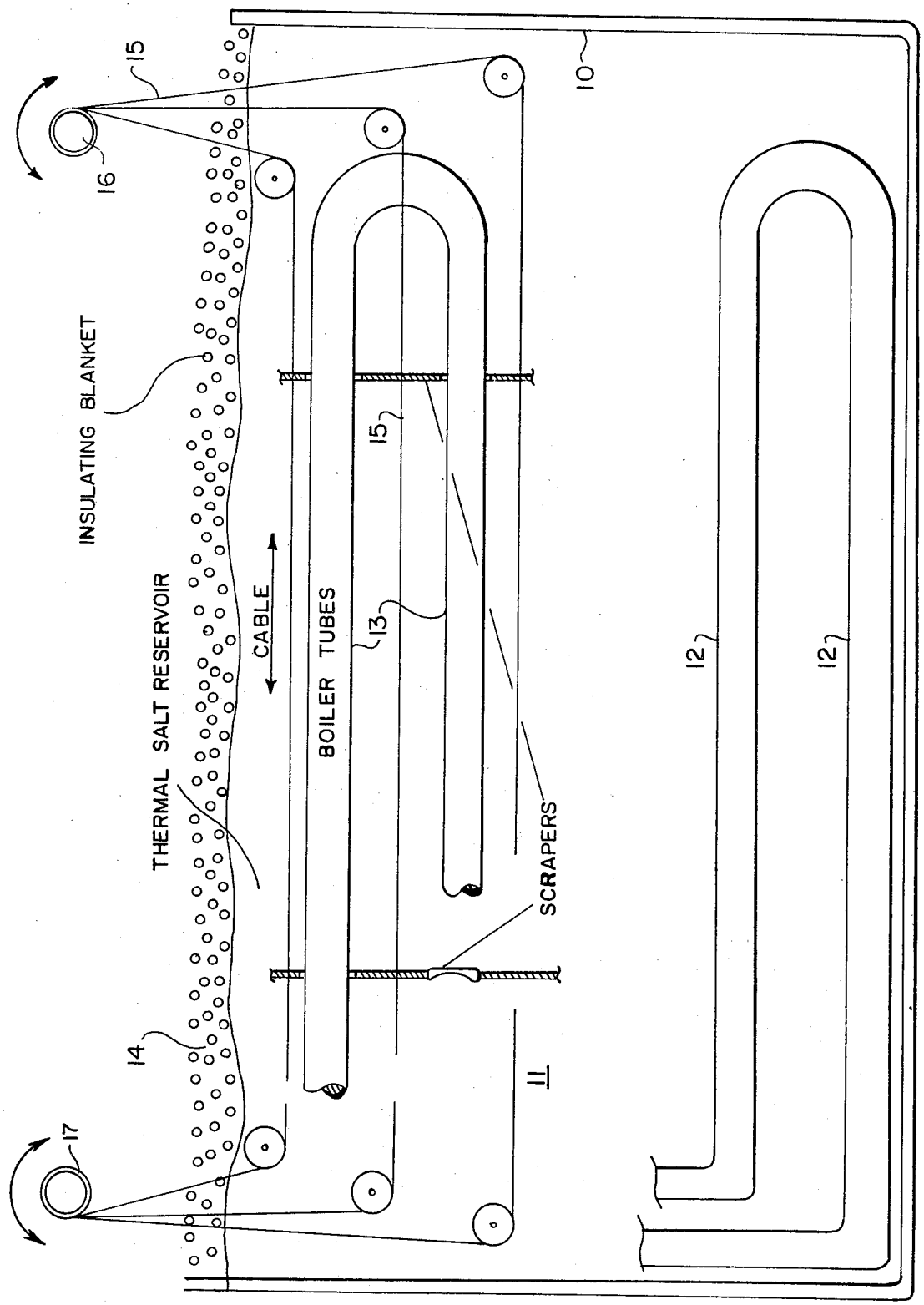

HEAT ENERGY RESERVOIR USING SOLID REMOVAL AND GRAVITATION SETTLING IN A MOLTEN-SOLID SALT BATH

STATEMENT OF GOVERNMENT INTEREST

The invention described herein may be manufactured and used by or for the Government of the United States of America for governmental purposes without the payment of any royalties thereon or therefor.

CROSS REFERENCE TO A RELATED APPLICATION

This application relates to a copending patent application directed to a solar energy system identified as Ser. No. 568,970 filed Apr. 17, 1975.

BACKGROUND OF THE INVENTION

This invention relates to a heat transfer reservoir and means within the reservoir by which heat is transfered to another medium, more particularly in a solar heat transfer reservoir for generating electricity.

Heretofore various systems have been used for transfering heat from a solar energy source to a heat storage facility for use during non-sunlight time. Such systems have used, hot water storage tanks, gravel beds in which the gravel is heated by the solar transfer means, as well as other systems.

SUMMARY OF THE INVENTION

This invention is directed to a heat storage reservoir containing a salt eutectic therein by which heat is stored and transfered for operation of a generator for generating electrical energy. The bottom of the reservoir has a network of heat transfer pipes or heat reactors which deliver heat to the salt. The upper portion of the reservoir is provided with a network of heat withdrawal pipes within which water is boiled to provide high temperature steam, or for chemical or industrial processing. The salt eutectic is covered with a layer of thermal insulation to prevent upward loss of heat from the reservoir and heat withdrawal pipes. The heat withdrawal pipes are provided with mechanical scrapers or a set of stiff brushes which make physical contact with the heat transfer pipes to mechanically remove any "frozen" salt crust which may become frozen onto the pipes. The mechanical scrapers or brushes are moved along the length of the pipes or a plurality of aligned scrapers or brushes are used to move along a portion of the lengths of the pipe to remove the salt crust. A mechanical cable or other arrangement is used to move the salt removal elements. The removed salt crust settles by gravity to the bottom of the reservoir where it melts due to the heat reactor.

BRIEF DESCRIPTION OF THE DRAWING

The drawing is a partial cross sectional view illustrating the relative parts.

DETAILED DESCRIPTION

Now refering to the drawing there is shown a partial cross sectional view of a reservoir 10 which contains therein a salt eutectic 11, such as $NaCl + CaCl_2$, or $NaCl + MgCl_2$. The salt eutectic is heated by a plurality of heat transfer pipes 12 secured near the bottom thereof in which the pipes form a network across the entire bottom from side-to-side. A chemical reaction heat source or any other heat source transfers heat through the pipe network 12 to the salt eutectic which melts the salt and keeps it hot. The reservoir is sufficiently large about 100 feet × 100 feet × 100 feet which when almost filled with the salt is sufficient to store heat at 550° C for about three days. The upper section of the reservoir includes therein a heat withdrawal network comprising a plurality of pipes 13 through which water or any other desired fluid may flow which fluid is heated by the melted salt eutectic. The upper surface of the salt eutectic is covered with a thermal insulating layer 14 or blanket to prevent heat from escaping from the reservoir. A suitable thermal blanket being vermiculite or any other suitable lightweight chemically nonreactive material. The reservoir is placed in the earth to provide support and insulation on the side and bottom.

In operation, the reservoir heat transfer, heat storage, heat withdrawal system may be used with a solar energy-electrical energy generation system which makes use of the sun's energy to produce heat that heats the salt eutectic. One such system is described in a copending patent application Ser. No. 568,970. $SO_3$ is heated in a reactor by paraboloid reflectors which produces $SO_2 + O_2$ with absorbed heat. The $SO_2 + O_2$ is directed into the heat transfer pipes 12 in the bottom of the reservoir. The $SO_2 + O_2$ reacts to produce $SO_3 + 22k$ cal/mole of heat which reaction heats the heat transfer pipes to about 550° C. The heat produced during the reaction melts the salt and the heat is stored in the salt eutectic such as $NaCl + CaCl_2$. The heat of the melted salt is transferred to the heat withdrawal pipe network near the top of the reservoir to heat the fluid within the pipes 13. If water is delivered to pipes 13, the water will boil to produce steam which may be directed to a steam turbogenerator to generate electricity then the condensed water is transmitted back to the pipe network to be converted to steam again. The system is continuous, once the salt has been completely heated, the heat stored in the salt eutectic is sufficient to produce steam for three days without any sun energy. The $SO_3$ produced by the chemical reaction of the $SO_2 + O_2$ is transmitted back to the solar heaters and chemically dissociated again into $SO_2 + O_2$ and absorbed heat to provide a closed system.

During operation of the heat transfer to the water system, a salt crust will form by freezing on the pipes in the upper section of the reservoir. The salt crust affects transfer of heat from the melted salt to the water in the pipes; therefore, the salt crust must be removed from the pipes. The salt crust removal mechanism is provided for this purpose. Cables 15 are wound onto shafts 16 and 17 at each end thereof and are secured along its length to metal plates 18 which have holes therein through which the pipes 13 fit. The metal plates are moved along the pipes by the cables which are wound onto or off shafts 16 and 17 depending on the direction in which the plates are moved. Cables 15 are moved about a shaft 16 to move the scrapers back and forth in order to scrape the crust off each pipe. The "frozen" salt crust falls to the bottom by gravity and is melted by the heat pipes at the bottom of the reservoir.

In order to aid the reaction in the heat transfer pipes 12, a catalyst may be used within the pipes. For the chemical reaction of $SO_2 + O_2$, the pipes may be filled with platinized asbestos.

This system provides a heat transfer network in a reservoir in which heat is transfered to a heat storage medium in the reservoir. The heat in the heat storage medium is withdrawn by a heat transfer system that transfers the heat to a medium to be heated. With a $NaCl + CaCl_2$ salt eutectic in a reservoir of sufficient size, sufficient heat may be stored to operate a steam generator for three days absence of the sun in a solar energy heat production system in which the heat is stored during sunny days.

Obviously many modifications and variations of the present invention are possible in light of the above teachings. It is therefore to be understood that with in the scope of the appended claims the invention may be practiced otherwise than as specifically described.

What is claimed and desired to be secured by Letters Patent of the United States is:

1. A heat sink reservoir, heat storage, heat transfer assembly which comprises:
    a salt eutectic;
    means for transferring heat to said salt eutectic;
    means for transferring heat from said salt eutectic to a medium for receiving said heat;
    means for scraping "frozen" salt from said means that transfers heat from said salt eutectic to the medium to receive heat,
    said reservoir including a thermal insulation layer covering said salt eutectic.

2. A heat sink reservoir, heat storage, heat transfer assembly as claimed in claim 1; wherein
    said means for transfering heat to said salt eutectic is a network of pipes which deliver heat to said eutectic and which is located near the bottom of said heat sink reservoir.

3. A heat sink reservoir, heat storage transfer assembly as claimed in claim 1; wherein
    said means for transfering heat from said salt eutectic to a heat receiver medium is a network of pipes located near the upper surface of said salt eutectic.

4. A heat sink reservoir, heat storage, heat transfer assembly as claimed in claim 1; in which
    said thermal insulation layer is vermiculite.

* * * * *